(12) United States Patent
Barrett

(10) Patent No.: US 6,529,597 B1
(45) Date of Patent: Mar. 4, 2003

(54) SYSTEM AND METHOD FOR AUTOMATED CONTACT MANAGEMENT

(76) Inventor: Daniel T. Barrett, 11723 Cresthill Rd., Hume, VA (US) 22639

( * ) Notice: Subject to any disclaimer, the term of this patent is extended or adjusted under 35 U.S.C. 154(b) by 0 days.

(21) Appl. No.: 09/459,992

(22) Filed: Dec. 14, 1999

(51) Int. Cl.[7] ............................................. H04M 3/00
(52) U.S. Cl. ............................. 379/265.02; 379/88.25
(58) Field of Search ......................... 379/74, 76, 79, 379/88.19, 88.2, 88.22, 88.25, 201.01, 265.02

(56) References Cited

U.S. PATENT DOCUMENTS

| | | | |
|---|---|---|---|
| 5,794,210 A | * 8/1998 | Goldhaber et al. | 705/14 |
| 5,855,008 A | * 12/1998 | Goldhaber et al. | 745/14 |
| 5,867,494 A | * 2/1999 | Krishnaswamy et al. | 370/352 |
| 5,999,525 A | * 12/1999 | Krishnaswamy et al. | 370/352 |
| 6,199,099 B1 | * 3/2001 | Gershman et al. | 719/203 |
| 6,335,927 B1 | * 1/2002 | Elliott et al. | 370/352 |
| 6,356,905 B1 | * 3/2002 | Gershman et al. | 707/10 |
| 6,401,085 B1 | * 6/2002 | Gershman et al. | 707/4 |

* cited by examiner

*Primary Examiner*—Creighton Smith
(74) *Attorney, Agent, or Firm*—Hunton & Williams

(57) ABSTRACT

A contact management system creates, generates and delivers a sequence of staged messages to job candidates and other targeted groups in an organized and efficient manner. A recruitment consultant identifies a candidate group and prepares messages to them via high-quality telephone voice messages, using high-bit digitization boards for timed delivery on a direct voice-box or ring-through basis. Successive messages are delivered on a carefully controlled time scale to ensure a balance between information overload and indifference and lack of urgency. Return calls may be discriminated according to Caller ID, Called Number ID or other parameters, for instance, to direct those calls to agents trained for specific job searches, such as those having certain language skills or other skills. The operation may access a contact database for updating of contact intervals and other operational parameters. Other types of campaigns, such as sales or charitable programs, may also be executed.

40 Claims, 4 Drawing Sheets

SYSTEM AND METHOD FOR AUTOMATED CONTACT MANAGEMENT

FIELD OF THE INVENTION

The invention relates to the field of contact management, and more particularly to the management of job recruitment contacts using automated telephone and network equipment.

BACKGROUND OF THE INVENTION

The field of job recruitment is a significant and fast-growing market in the United States. Burgeoning labor markets have increased the demand for high-quality contact, screening and recruitment of managers, accountants, engineers, attorneys and others for professional and technical job slots. It is not uncommon for large organizations to spend millions of dollars a year in recruitment budgets. Recruitment campaigns are typically farmed out to outside consultants charged with the task of bringing in suitable candidates for selection. The employers benefit from efficient access to those skilled labor pools.

However, the traditional methodology of a recruitment firm is not highly efficient or always likely to produce the best candidate results. More particularly, and as illustrated in FIG. 1, in a typical recruitment firm a senior manager or a partner in that firm becomes aware of a job slot to be advertised, circulated and filled within a certain time frame. The typical approach is for that senior person to create a job description and enter that job description in some sort of automated databased package. A group of recruitment agents reporting to the recruitment manager then scans the database entries and places telephone calls to lists of candidates matched to individual job slots.

The list of candidates may be broken down and associated with one or more pending job slots according to skill sets, experience, geographic locations and other factors. After the group of calls is placed, which may number in the hundreds or more, those candidates expressing a desire to explore the available opening are screened under the oversight of the recruitment manager with the hope of placing the candidate with the employer.

However, this technique is less than perfectly efficient in more than one regard. For one, typically the contact messages left with or spoken to the job candidates during the initial contact by the recruitment agent are undifferentiated, often simply the same for all of the job candidates. Moreover, the list of candidates is not highly examined for the closest possible match to the available job slot. Rather, reliance is placed on reaching a great many candidate workers in the hope that a comparative handful will truly meet the criteria set out in the job description.

Thus, because the initial contacts are inappropriate to the majority of job applicants, gaining the interest of any individual candidate is not a likely proposition. The percent yield on callbacks for such high volume recruiting campaigns is therefore predictably not great, sometimes less than 25 per cent. Of those persons responding, only a fraction again will be suitable to the criteria of the job slot and willing to take the subsequent steps necessary to obtain the position. Thus, most of the efforts expended by the recruitment firm as a whole are wasted on relatively low-yield contacts.

More efficient, highly targeted and rigorous recruitment methodology is desirable.

SUMMARY OF THE INVENTION

The invention overcoming these and other problems in the art relates to a system and method for contact management which develops and executes lo high-quality, high-yield candidate contacts and executes those contacts using a designed sequence of messaging events aimed at producing the greatest possible candidate yields. In the invention, automated call delivery equipment may be programmed to deliver a high-resolution voice message introducing a new job opportunity to a selected group of candidates, after which a series of further messages are delivered in defined stages. That message sequence offers successively greater detail and emphasis concerning the job slot.

The intervals of time between the delivery of the messages are carefully controlled to encourage the greatest possible consideration by the group of active candidates. Receipt of call back inquiries is also managed using prepared agents according to pre-assigned dial-up telephone lines. A contact management database may be used to assist in the management and documentation of the recruitment sequence, and to aid the efficiency of the overall operation.

Because of the high quality of the voice mail messages, the targeted and customizable nature of the message content and the controlled timing of the contact sequence and other aspects of the invention, overall initial callback yield may reach 75 per cent or greater for a given recruitment campaign. The use of automated message processing on the delivery side permits throughput that may be 3 times or greater that of manual contact operations as well. Recruitment costs may therefore be reduced, and staffing requirements for the recruitment firm and its clients may be lessened considerably.

BRIEF DESCRIPTION OF THE DRAWINGS

The invention will be described with reference to the accompanying drawings, in which like elements are referenced by lied numerals.

DETAILED DESCRIPTION OF THE DRAWINGS

Figure 1:
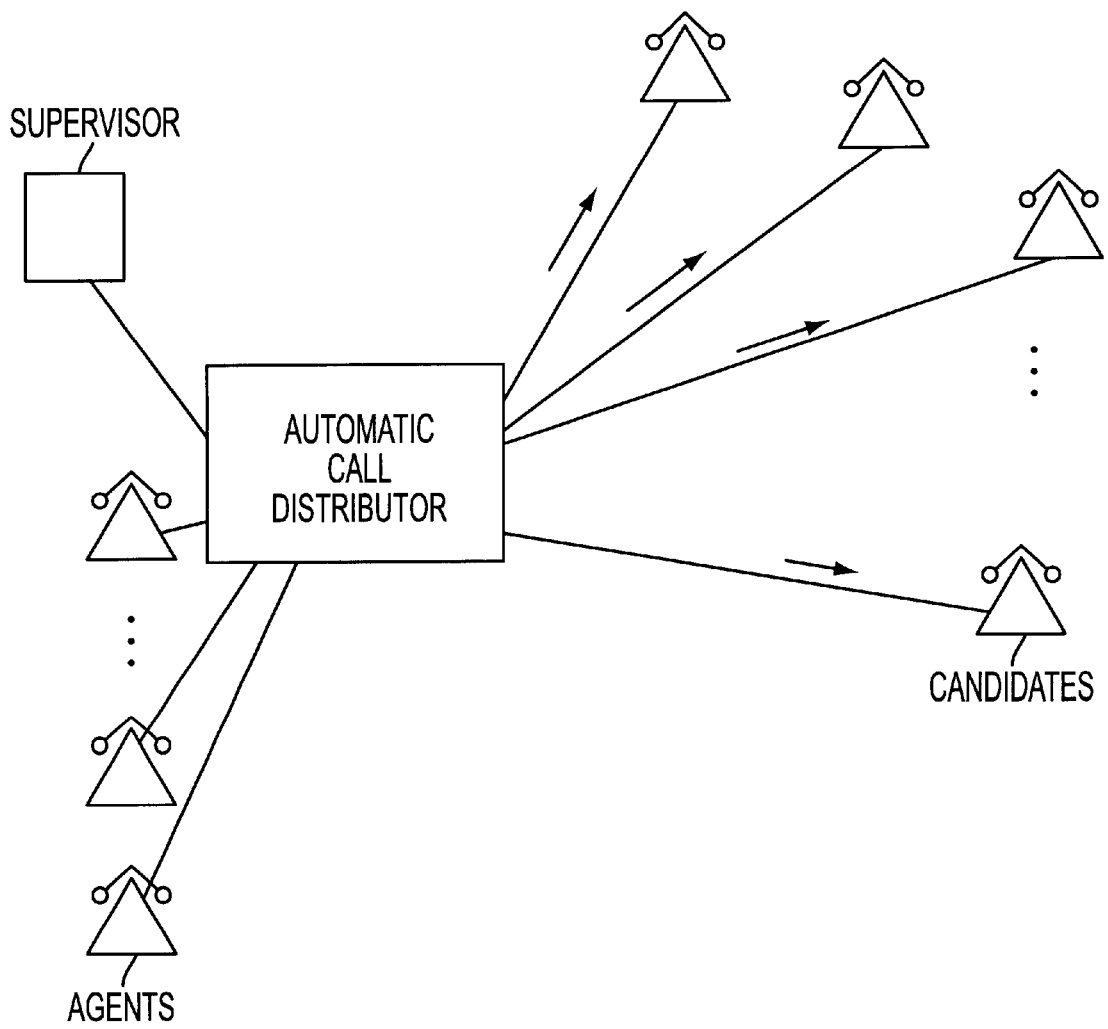
FIG. 1 illustrates the operation of a recruitment agency according to the prior art.
Figure 2:
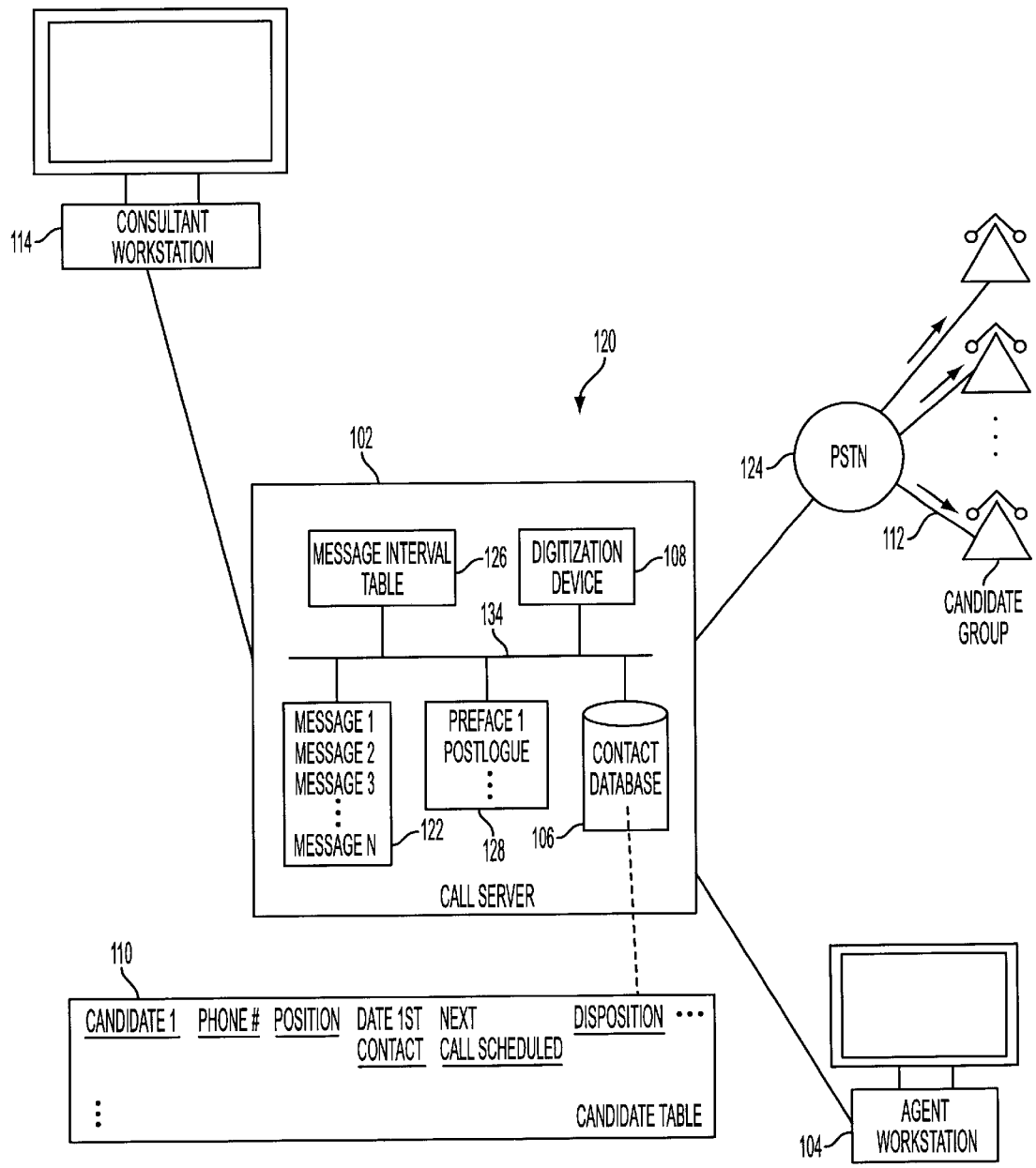
FIG. 2 illustrates an overall architecture of a recruitment operation according to the invention.

The invention will be described with reference to an illustrative embodiment of a recruitment operation 120 shown in FIG. 2. As illustrated in FIG. 2, the recruitment operation 120 according to the invention includes a telecommunications architecture for the development and execution of outbound telephone contacts, and the receipt and processing of telephone responses from a group of targeted job candidates 112. Overall responsibility for the recruitment operation 120 may lie with one or more recruitment consultants who may operate a consultant work station 114, such as a networked computer work station or other information device.

The recruitment consultant is responsible for developing contacts and job search opportunities from corporations, government entities, universities or other organizations. After undertaking a given job search assignment, the recruitment consultant may operate work station 114 to enter a job description for the job slot into a contact database 106, such as the commercially available Goldmine™ package.

The recruitment consultant may also record one or more telephone messages directed to the job search assignment using a digitization device 108 located in a call server 102 within the call center operation 120. The digitization device 108 may include or be, for instance, an analog-to-digital voice board such as those manufactured by Dialogic™, a unit of the Intel™ Corporation. The call server 102 may be or include, for instance, a personal computer running the Microsoft Windows™ 95, 98, NT, Unix, Linux, Solaris™, OS/2™, BeOS™, MacOS™ or other operating system.

The call server 102 may furthermore include electronic memory such as RAM (random access memory) or EPROM (electronically programmable read only memory), storage such as a hard drive, CDROM or rewritable CDROM or other magnetic, optical or other media. The digitization device 108, contact database 106 and other associated components may be connected over an electronic bus 134 as shown in FIG. 2, as will be appreciated by persons skilled in the art.

More specifically, the recruitment consultant may record and store a sequence of messages in a message tree 122 designed to introduce and attract desirable candidates to the advertised job position. The voice messages located in the voice message tree 122 may consist of an initial message (illustratively Message 1) introducing the recruitment consultant by name, briefly describing the nature of the position being searched, the interest of the recruitment consultant in discussing the possibilities with the candidate, all with or without identifying the potential employer according to the confidentiality requirements of that client.

A second message (Message 2) stored in the message tree 122 may be recorded which refers to the first message, and indicates to the recipient that the second telephone message is being delivered to follow up on the job description provided in the initial phone message some time ago. That second message may also include additional description of the responsibilities of the open position, management level, geographic location and other selected details.

Similarly, a third message (Message 3) may also be recorded by the recruitment consultant, the content of which references the prior to contact and now describes more particular details about the job description such as corporate titles, the expected window of time in which the position is being recruited, compensation ranges and other terms of the position, so that the nature of the job opportunity becomes increasingly clear.

The recruitment consultant may record a fourth or higher number of messages, each with successive embellishments on the opportunity presented, the profile of the candidate and its consistency with the job, and other information. The digitization device 108 may record and store the message tree 122 in electronic memory, hard drive or other storage for retrieval and execution by the call server 102.

A preferable embodiment of the invention employs the aforementioned Dialogic™ component in the digitization device 108, because the 16, 20 or higher bit DAC resolution of such components permit high-resolution recording of the messages making up message tree 122. When the messages so recorded are received by the candidates within the candidate group 112, the played back message is often indistinguishable from the recording of a live call. The realism of the contact is therefore enhanced.

Once the desired sequence of messages in the message tree 122 are prepared and recorded, the recruitment consultant may program the call server 102 to set up delivery parameters for the message tree 122, including a schedule for delivery. More particularly, separating the messages in the sequence of the message tree 122 by too short of an amount of time may create the impression amongst candidate group 112 that they are being pressed with a false urgency, or that the recruitment campaign is not being closely overseen.

By the same token, if the successive messages of the message tree 122 are separated by too long a time between contacts, the candidate group 112 may lose interest or forget the context of previous descriptions. In general, the recruitment consultant may preferably program the call server 102 to separate the successive messages by an interval of 5 to 14 days.

However, a message interval may be adjusted by the recruitment consultant according to particular search needs. Once determined, the timing for the messages in the message tree 122 may be entered in a message interval table 126, dictating the amount of time between delivery of the individual messages by call server 102. When the recruitment campaign is to commence, call server 102 initiates the delivery of the messages from message tree 122 via the public switched telephone network 124, in turn connected to the candidate group 112 at known telephone or other destination numbers. The recruitment consultant may permit some flexibility in the message intervals reflected in the message interval table 126, for instance, when no answering machine pickup is detected at the number of a given candidate.

This may occur, for instance, when a given candidate in the candidate group 112 has disconnected a message taking machine, has calls forwarded to another number without a recording machine such as a cellular number, is on the line and busy, and so forth. The message interval table 126 may be programmed to permit rollover or repeat intervals in such aborted instances. Such failed deliveries may for instance be automatically detected by digitization device 108 or other hardware using tone decoding or other techniques.

The call server 102 may be preferably programmed to execute the delivery of the messages from message tree 122 at strategic times of the day or night. The mode of message delivery may also be strategically adjusted to ensure the greatest probability of receipt. For instance, in telephone service areas which permit it, the call server 102 may be programmed to deliver voice messages from message tree 122 directly to a candidate's voice mail without ringing the destination number.

That technique may ensure the receipt of a voice message without screening, premature hangups or other delivery failures. Likewise, if the recruitment consultant chooses to deliver a ring-through call, they may schedule the message delivery for a time during a working day or other time so that the intended recipient may be expected to be unavailable, and an answering machine may be reached.

However, in an embodiment where the call server 102 is programmed to deliver messages from the message tree 122 to the candidate group 112 on a ring-through basis during normal hours or otherwise, there is provided an agent work station 104 connected to the call server 102. The agent work station 104 is manned by an attending agent on duty to monitor the message delivery process.

More particularly, the attending agent at agent work station 104 may be presented with an on-screen alert when a recipient amongst the candidate group 112 picks up a telephone call as a live call. In that instance, the call server 102 diverts the call connection to a telephone set of the attending agent at agent work station 104, for live dialogue with that agent rather than message delivery. The attending agent is preferably prepared to provide an introduction and discussion of the purpose of the call and job slot being searched, so that the candidate's interest can be gauged and details provided if they wish to pursue the contact.

In another aspect of the invention, the call server 102 may incorporate a merge file 128 containing additional voice or computer-generated files designed to personalize or customize the base message content of the messages contained in message tree 122. In this regard, the contact database 106 from which the candidate group 112 is culled may include indications that the messaging attempts to certain or all of the candidates may be personalized, with an introductory greeting separately recorded for them or otherwise. In this respect, call server 102 may be programmed to attach a personalized or generic sound file to the base messages of message tree 122 for each of the successive candidates to be called located within candidate table 110 of the contact database 106.

A typical message contained in merge file 128 for a candidate might read "Hello, Candidate Jones, this is Consultant Smith. I'm calling you tonight to advise you of an interesting opportunity that has developed at Corporation X that you may wish to learn more about." The remainder of the message to be delivered to that particular candidate may then continue with the corresponding message from message tree 122. Alternatively, a personalized or customized postscript to the base message of message tree 122 may be appended to the end of the message via merge file 128, with or without a tailored preface as just described.

During the operation of recruitment operation 120, therefore, a programmed sequence of introductory, advisory and informational messages are efficiently delivered to high-potential candidates amongst candidate group 112. By thorough screening of the job position, identification of job criteria and skill sets within the candidate table 110, and the progressive education of the candidate group 112 about the position concerned, the invention results in a high efficiency and high yield facility for the contact of professional and other workers. The inventor has discovered that by balancing the delivery of the job description and terms across a sequence of increasingly detailed message content, and proportionate message intervals recorded in the message interval table 126, percentage yields of 70–80 percent or greater in terms of serious candidate response can be achieved.

Once one or more candidates within candidate group 112 have closed he communication loop by responding to the first or later message and are determined to have a satisfactory profile for the position at hand, interview and other steps may be arranged with or without the necessity of invoking the contact management system of the invention at those stages. However, because staffing requirements are lessened, targeting of candidates to job requirements is enhanced and the timing is balanced to achieve the greatest possibility of retention, the efficiency and efficacy of a recruitment operation 120 according to the invention significantly exceeds conventional recruitment agencies.

Figure 3:
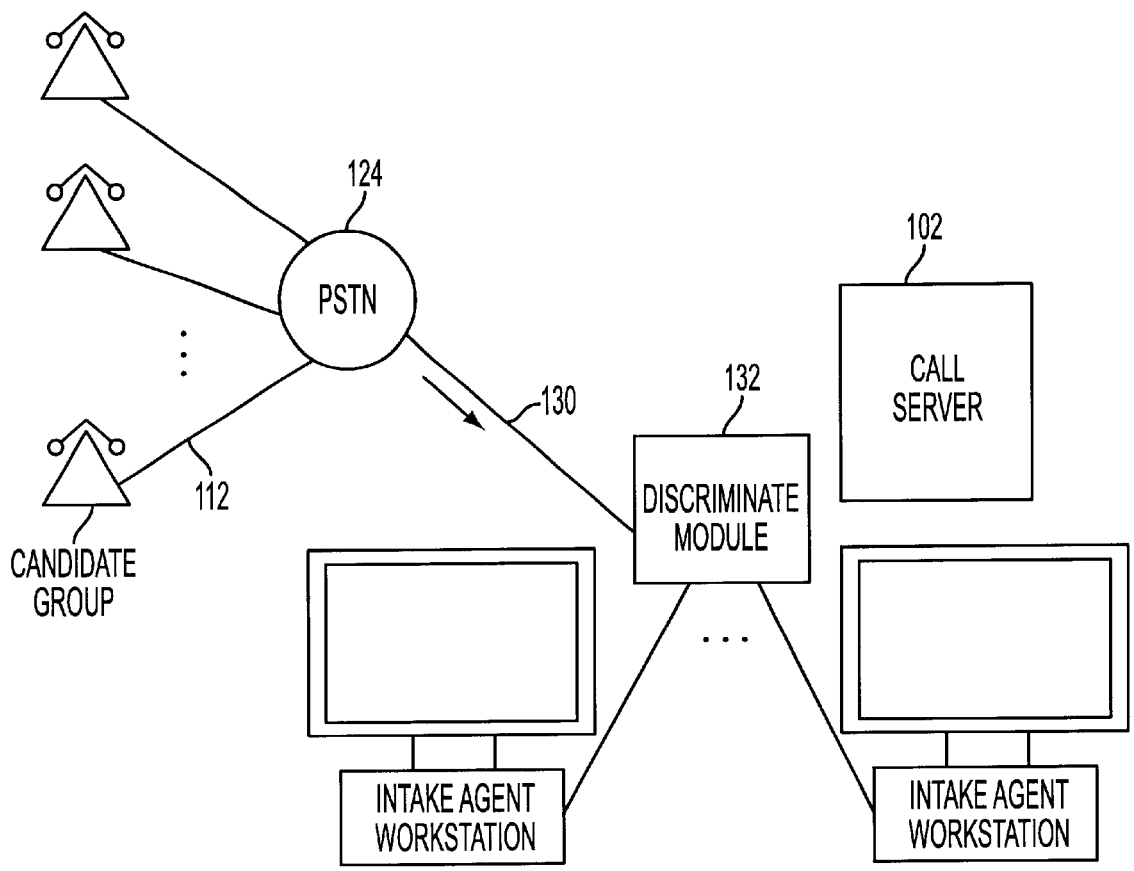
FIG. 3 illustrates an intake processing function of a recruitment operation according to the invention.

Of course, as noted above, after the initiation of the recruitment campaign and the delivery of the first and subsequent message according to the invention, it is hoped that one or more persons in the candidate group 112 will be sufficiently interested to contact the recruitment consultant for further exploration. In this regard, and as illustrated in FIG. 3, the recruitment operation 120 also preferably includes an intake trunk 130 for receipt of return calls from the candidate group 112. Intake trunk 130 may consist of one or more physical or logical (800) numbers, or other contact numbers or channels in turn connected to or integrated with call center server 102, or other automatic call distributor (ACD) or other telecommunications equipment. Intake trunk 130 may alternatively be connected to one or more separate telecommunications facilities dedicated to callback processing.

In respect of the callback side of recruitment operation 120, multiple recruitment campaigns may be distinguished by different physical or logical callback numbers on intake trunk 130, so that Caller ID, automatic number identification (ANI), Called Number ID or other calling information may be used to discriminate and direct callers to particular intake work stations 118 according to the job slots being called about. Likewise, individual candidates within a candidate group 112 may have different callback numbers assigned to them according to their relative seniority, skill set or other variables.

The intake agents at intake work station 118 in turn engage the candidates in dialog concerning the job profile and other information to make a determination as to their continued interest, which may be noted into the candidate table 110 for further processing, using outbound call generation on call server 102 or live operator or other contacts. Discrimination module 132 may perform the function of directing intake calls according to Caller ID, ANI, Called Number ID or other calling information to predetermined sets of the intake work stations 118.

In another respect, the candidate table 110 may be configured to indicate the native language of individual candidates within candidate group 112, to divert the message delivery process to alternative messages within message tree 122 prepared or translated into another language, such as Spanish.

Similarly, recruitment campaigns which are carried out internationally may assign different callback numbers according to the expected language of individual candidates, so that the discrimination module 132 may direct speakers of given languages amongst the candidate group 112 to intake agents at agent work stations 118 having a corresponding language skill. The invention may thus be deployed in a multilingual, multinational environment.

Figure 4:
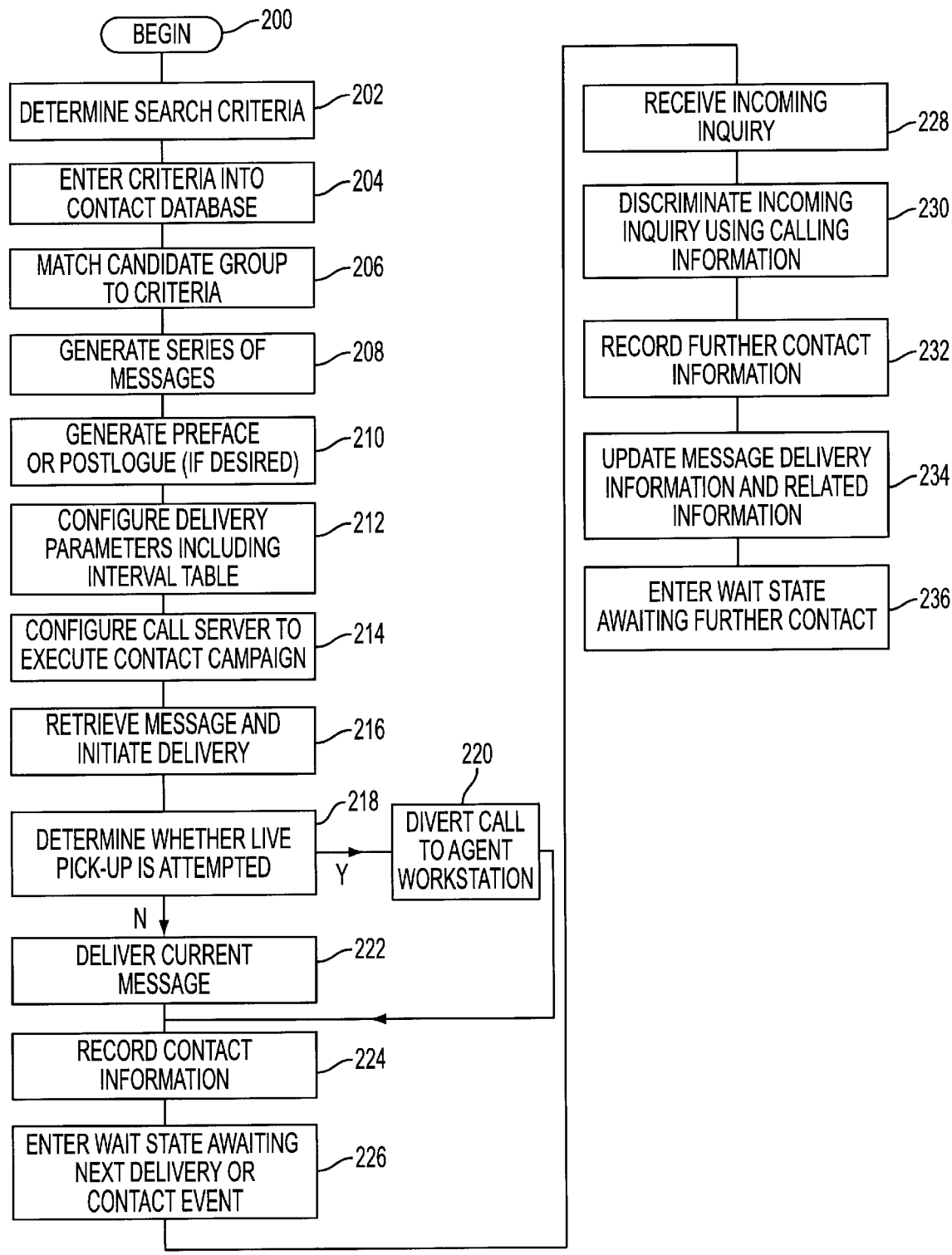
FIG. 4 illustrates a flowchart of overall recruitment management according to the invention.

General message generation and call processing according to the invention will be described with reference to the flowchart of FIG. 4. In step 200, processing begins. In step 202, the criteria for a new position to be searched are determined, by the recruitment consultant or otherwise. In step 204, the criteria are entered into the contact database 106. In step 206, a determination is made matching an appropriate candidate group 112 to the criteria for the new position. This matching may be done, for instance, using the contact database, key word searches as well as manual input from the recruitment consultant or others. In step 208, the individual staged messages which compose message tree 122 are created and recorded using digitization device 108.

During step 210, a preparatory or end of call message or both are created and recorded into merge file 128 if desired. In step 212 the delivery parameters of the message interval table 126 are configured by the recruitment consultant or otherwise, including time between successive calls. In step 214, the call server 102 is programmed to execute the contact campaign according to the candidate group 112, message tree 122 and related information so generated.

In step 216, upon the scheduled time for message delivery, the first or next message is retrieved from message tree 122 by the call server 102, and a delivery by telephone call over the public switched telephone network 124 to one or more members of the candidate group 112 is initiated. The call delivery ay be by ring-through telephone call, direct entry into voice mail, network enabled message delivery such as Internet telephony or voice-enabled e-mail, or by other means.

The appropriate message or messages from message tree 122 may be initiated for delivery to the candidate group 112 serially or in parallel, according to the hardware redundancy employed in call server 102. It may be noted that different messages in different stages within message tree 122 may be transmitted to individual candidates within the candidate group 112 at different times, depending upon contact's feedback, the closeness of match to the candidate's profile to the job criteria, and other factors.

In step 218, a determination is made whether the individual candidate receiving the current message has attempted a live pick-up of the telephone call if the telephone call is being placed on a ring-through basis. If a live pick-up is being made, in step 220 an attending agent at agent work station 104 receives an alert and the call is intercepted and diverted to the agent work station 104. After engaging in dialogue with the candidate, processing proceeds to step 224.

If a live pick-up is not attempted, in step 222 the current message is delivered to voice mail or otherwise. In step 224, an indication of the contact made, the time it is made, the number to which the message was transmitted and other information may be recorded in the candidate table 110. In step 226, a wait state is entered awaiting the elapse of the time interval for next message delivery according to the message interval table 126, or other contact event.

After delivery of the first or later messages from message tree 122, the recruitment operation 120 of the invention stands ready to receive return feedback from candidates wishing to pursue the job opportunity. In step 228, an incoming inquiry from one or more persons in the candidate group 112 is received over the incoming trunk 130. In step 230, the incoming inquiry may be processed by the discrimination nodule 132 according to Caller ID, ANI, Called Number ID or other calling information. According to that discriminated calling information, the incoming inquiry is directed to a corresponding intake agent work station 118 for processing according to the category of telephone inquiry being received.

For instance, candidates calling about a certain job having Spanish or other language requirements may be directed to intake agents having that language capability, or candidates calling in concerning a financial management position may be directed to intake agents with training and preparation in that field and the available position or positions. In step 232, after engaging in dialogue with the candidate, the intake agent records further progress information into the candidate table 110 for the candidate.

That information may, for instance, include a flag or fields for indicating that a candidacy or job is closed, that a candidate has accepted another position or other information. In step 234, the contact database 106 may interface with the candidate table 110 and the most recent contact information to reschedule the next message through message tree 122.

For instance, the delivery of that message may be stepped up or delayed or a preface or postlogue from merge file 128 may be added or deleted, or messages in the sequence may be skipped completely because of accelerated interest in the position. Such configuration may be done or done in part by way of manual input by the recruitment consultant at work station 114, but may include automatic programming of the contact database 106 to be triggered by particular events in the recruitment process.

Events or information affecting the sequence may include, for example, the receipt by the candidate of a competing job offer, deadlines imposed by the potential employer or the candidates, and other information. In step 236, the call server 102 returns to a wait state awaiting further inquiries over intake trunk 130. One or more segments of the processing illustrated in FIG. 4 may be repeated over days, weeks or longer to promote the recruitment campaigns managed by recruitment operation 120.

The foregoing description of the system and method for contact management of the invention is illustrative, and variations in configuration and implementation will occur to persons skilled in the art. For instance, while the call center operation 120 has generally been described as operating under the control of a single recruitment consultant at work station 114, more than one recruitment consultant or persons of varying seniority may have varying degrees of access privileges to the contact database 106 and other elements, thus allowing a division of oversight and responsibility.

Moreover, while the mode of communication has been most explicitly described in terms of telephonic contact both in terms of message generation and feedback receipt, other forms of network-enabled communication including voice-over-Internet, e-mail, cellular telephone, pager and other communication technologies may be employed. Likewise, while the invention has been described in terms of an organization seeking to attract candidates for employment, other contact relationships are possible. For instance, an organization might wish to solicit individuals in a charitable campaign. Other contact goals, such as direct sales, may likewise be furthered by the invention. The scope of the invention is accordingly intended to be limited only by the following claims.

What is claimed is:

1. A system for the management of a call contact operation, comprising:
   a call server, the call server storing contact information representing a plurality of candidates;
   a messaging interface, communicating with the call server, the messaging interface operative to communicate via at least one communications channel to transmit a predetermined message sequence to the candidates according to the contact information.

2. The system of claim 1, wherein the messaging interface comprises a digitization device to record and play back the predetermined message sequence.

3. The system of claim 2, wherein the predetermined message sequence comprises at least one recorded voice message.

4. The system of claim 3, wherein the at least one recorded voice message comprises a plurality of recorded voice messages.

5. The system of claim 4, wherein the recorded voice messages correspond to a set of message stages, each of the candidates being associated with one of the message stages according to the contact information.

6. The system of claim 5, further comprising an interval table, the interval table determining a scheduled time for the delivery of the recorded messages of the message stages.

7. The system of claim 6, wherein the interval table is updated according to contact results stored in the contact information.

8. The system of claim 7, wherein the messaging interface appends at least one of a recorded preface and a recorded postlogue to at least one of the recorded voice messages.

9. The system of claim 1, wherein the messaging interface is operable to transmit the predetermined message sequence according to a plurality of modes.

10. The system of claim 9, wherein the modes comprise at least one of direct-to-voice mail and ring-through modes.

11. The system of claim 1, wherein the at least one communications channel comprises at least one of the public switched telephone network, a wireless network, and a network-enabled telephony connection.

12. The system of claim 1, further comprising an agent workstation, the agent workstation configured to intercept a live call contact upon detection of predetermined intercept conditions.

13. The system of claim 12, wherein the intercept conditions comprise a live pick-up by a candidate.

14. The system of claim 1, further comprising at least one return contact intake channel.

15. The system of claim 14, wherein the at least one return contact intake channel comprises at least one predesignated telephone number.

16. The system of claim 15, wherein the at least one predesignated telephone number comprises a plurality of telephone numbers, and subgroups of the candidates are associated with predetermined sets of the telephone numbers according to contact information.

17. The system of claim 16, wherein return calls on the sets of telephone numbers are differentiated according to at least one of Caller ID information, Called Number information, and ANI information.

18. The system of claim 1, further comprising a contact database, the contact database storing the contact information.

19. The system of claim 1, wherein the call contact operation comprises an employment search.

20. The system of claim 1, wherein the call contact operation comprises a direct sales campaign.

21. A method for the management of a call contact operation, comprising the steps of:
   a) storing contact information representing a plurality of candidates; and
   b) communicating via at least one communications channel to transmit a predetermined message sequence to the candidates according to the contact information.

22. The method of claim 21, wherein the step of a) storing contact information comprises a step of (c) using a digitization device to record and play back the predetermined message sequence.

23. The method of claim 22, wherein the predetermined message sequence comprises at least one recorded voice message.

24. The method of claim 23, wherein the at least one recorded voice message comprises a plurality of recorded voice messages.

25. The method of claim 24, wherein the recorded voice messages correspond to a set of message stages, further comprising a step of (d) associating each of the candidates with one of the message stages according to the contact information.

26. The method of claim 25, further comprising an interval table, the interval table determining a scheduled time for the delivery of the recorded messages of the message stages.

27. The method of claim 26, further comprising a step of (e) updating the interval table according to contact results stored in the contact information.

28. The method of claim 27, further comprising a step of (f) appending at least one of a recorded preface and a recorded postlogue to at least one of the recorded voice messages.

29. The method of claim 21, wherein the predetermined message sequence is transmitted according to a plurality of modes.

30. The method of claim 29, wherein the modes comprise at least one of direct-to-voice mail and ring-through modes.

31. The method of claim 21, wherein the at least one communications channel comprises at least one of the public switched telephone network, a wireless network, and a network-enabled telephony connection.

32. The method of claim 21, further comprising a step of (g) intercepting a live call contact at an agent workstation upon detection of predetermined intercept conditions.

33. The method of claim 32, wherein the intercept conditions comprise a live pick-up by a candidate.

34. The method of claim 21, further comprising a step of (h) monitoring at least one return contact intake channel.

35. The method of claim 34, wherein the at least one return contact intake channel comprises at least one predesignated telephone number.

36. The method of claim 35, wherein the at least one predesignated telephone number comprises a plurality of telephone numbers, and further comprising a step of (i) associating subgroups of the candidates with predetermined sets of the telephone numbers according to contact information.

37. The method of claim 36, further comprising a step of () differentiating return calls on the sets of telephone numbers according to at least one of Caller ID information, Called Number information, and ANI information.

38. The method of claim 21, further comprising a step of (k) storing the contact information in a contact database.

39. The method of claim 21, wherein the call contact operation comprises an employment search.

40. The method of claim 21, wherein the call contact operation comprises a direct sales campaign.

* * * * *